US 12,531,945 B2

(12) United States Patent
Ikeda et al.

(10) Patent No.: US 12,531,945 B2
(45) Date of Patent: Jan. 20, 2026

(54) INFORMATION PROCESSING DEVICE AND NON- TRANSITORY COMPUTER-READABLE STORAGE MEDIUM STORING PROGRAM

(71) Applicant: SEIKO EPSON CORPORATION, Tokyo (JP)

(72) Inventors: Iwane Ikeda, Nagano (JP); Hiroyuki Kuramoto, Shiojiri (JP); Yui Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 406 days.

(21) Appl. No.: 18/149,841

(22) Filed: Jan. 4, 2023

(65) Prior Publication Data
US 2023/0216949 A1    Jul. 6, 2023

(30) Foreign Application Priority Data

Jan. 6, 2022 (JP) .................................. 2022-001129

(51) Int. Cl.
*H04M 1/72472* (2021.01)
*H04W 8/00* (2009.01)

(52) U.S. Cl.
CPC ....... *H04M 1/72472* (2021.01); *H04W 8/005* (2013.01)

(58) Field of Classification Search
None
See application file for complete search history.

(56) References Cited

U.S. PATENT DOCUMENTS

| 2012/0077515 | A1 | 3/2012 | Oishi |
| 2017/0085694 | A1 | 3/2017 | Shibao |
| 2017/0324876 | A1 | 11/2017 | Tokuchi |
| 2018/0219989 | A1* | 8/2018 | Takaba .............. H04M 1/72466 |
| 2020/0278437 | A1* | 9/2020 | Kato ..................... G01S 5/0242 |
| 2021/0132876 | A1 | 5/2021 | Komatsu |

FOREIGN PATENT DOCUMENTS

| JP | 2007067723 | 3/2007 |
| JP | 2012095265 | 5/2012 |
| JP | 2017-059063 A | 3/2017 |
| JP | 2017201763 | 11/2017 |
| JP | 2021072573 | 5/2021 |

* cited by examiner

*Primary Examiner* — Frantz Bataille
(74) *Attorney, Agent, or Firm* — WORKMAN NYDEGGER

(57) ABSTRACT

An information processing device wirelessly communicates with an electronic device via a wireless communication unit and includes a search result acquisition unit, a direction information acquisition unit, and a controller. The search result acquisition unit acquires information of a search result about the electronic device by a search via the wireless communication unit. The direction information acquisition unit acquires direction information representing a direction in which the electronic device exists, by short-range wireless communication with the electronic device via the wireless communication unit. The controller displays, on a display, a list of a plurality of the electronic devices found by the search, based on the information of the search result, and executes processing of deciding a display priority order of the electronic device, based on the direction information, and displaying information of the electronic device on the display, based on information of the display priority order.

16 Claims, 13 Drawing Sheets

INFORMATION PROCESSING DEVICE AND NON-TRANSITORY COMPUTER-READABLE STORAGE MEDIUM STORING PROGRAM

The present application is based on, and claims priority from JP Application Serial Number 2022-001129, filed Jan. 6, 2022, the disclosure of which is hereby incorporated by reference herein in its entirety.

BACKGROUND

1. Technical Field

The present disclosure relates to an information processing device and a non-transitory computer-readable storage medium storing a program, or the like.

2. Related Art

According to the related art, a technique of displaying devices searched out using a wireless communication function, as a device list on a predetermined display unit, is known. JP-A-2017-059063 is an example of the related art.

However, a technique of deciding a display priority order in which devices are displayed, based on information about the directions of devices that are searched out, is not disclosed.

SUMMARY

An aspect of the present disclosure relates to an information processing device wirelessly communicating with an electronic device via a wireless communication unit. The information processing device includes: a search result acquisition unit acquiring information of a search result about the electronic device by a search via the wireless communication unit; a direction information acquisition unit acquiring direction information representing a direction in which the electronic device exists, by short-range wireless communication with the electronic device via the wireless communication unit; and a control unit displaying, on a display unit, a list of a plurality of the electronic devices found by the search, based on the information of the search result. The control unit executes processing of deciding a display priority order of the electronic device, based on the direction information, and displaying information of the electronic device on the display unit, based on information of the display priority order.

Another aspect of the present disclosure relates to a non-transitory computer-readable storage medium storing a program. The program causes a computer to function as: a wireless communication unit wirelessly communicating with an electronic device; a search result acquisition unit acquiring information of a search result about the electronic device by a search via the wireless communication unit; a direction information acquisition unit acquiring direction information representing a direction in which the electronic device exists, by short-range wireless communication with the electronic device via the wireless communication unit; and a control unit displaying, on a display unit, a list of a plurality of the electronic devices found by the search, based on the information of the search result. The control unit executes processing of deciding a display priority order of the electronic device, based on the direction information, and displaying information of the electronic device on the display unit, based on information of the display priority order.

BRIEF DESCRIPTION OF THE DRAWINGS

FIG. 1 explains an example of the configuration of an information processing device, or the like.

DESCRIPTION OF EXEMPLARY EMBODIMENTS

An embodiment will now be described. However, the embodiment described below should not unduly limit the contents of the present disclosure described in the claims. Not all the components described in the embodiment are necessarily essential components of the present disclosure.

Figure 1:
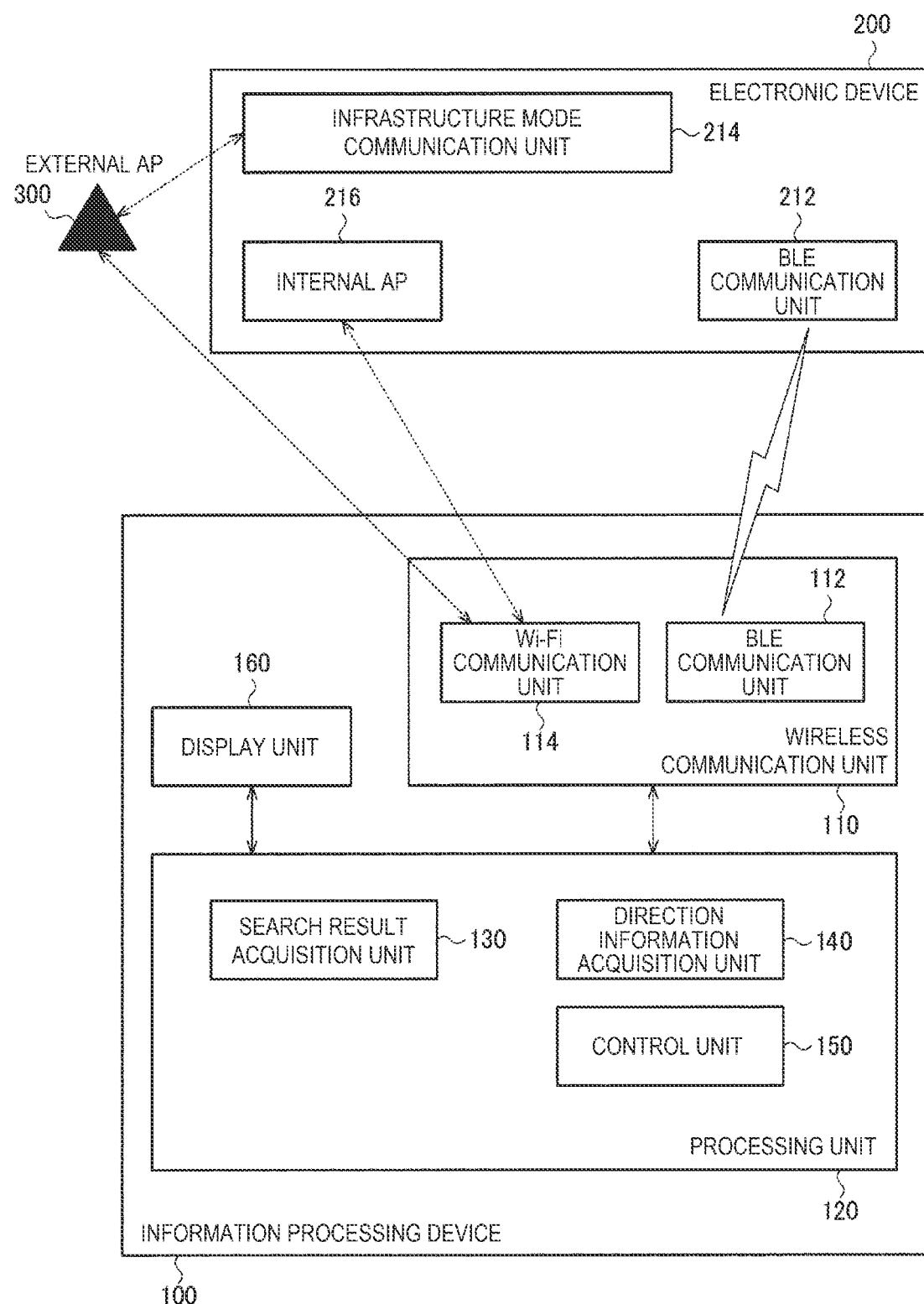

FIG. 1 is a block diagram explaining an example of the configuration of an information processing device 100 according to this embodiment, and a system including the information processing device 100 and an electronic device 200. The information processing device 100 includes a wireless communication unit 110, a processing unit 120, and a display unit 160. The information processing device 100 wirelessly communicates with the electronic device 200 via the wireless communication unit 110. However, the information processing device 100 in this embodiment is not limited to the configuration shown in FIG. 1 and can be implemented with various modifications such as omitting a part of the components thereof or adding another component. The another component is, for example, an operation unit, a memory or the like. The electronic device 200 is, for example, a printer but may be a personal computer, a wearable device, a biological information measuring device, a robot, a video device, or a physical quantity measuring device or the like. The wearable device refers to a smartwatch or an activity tracker or the like. The biological information measuring device refers to a pulsimeter or a pedometer or the like. The video device refers to a camera or a projector or the like. The physical quantity measuring device refers to a thermometer or a weight scale or the like. The printer in this example includes a multifunction peripheral. The multifunction peripheral refers to a printer including other functions than a printer function. The other functions than the printer function include a copy function, a facsimile function, or a scanner function or the like, and may also be other functions. The configuration of the system including the information processing device 100 and the electronic device 200 according to the embodiment is not limited to the example shown in FIG. 1. For example, the information processing device 100 may wirelessly communicate with a plurality of electronic devices 200, and the electronic device 200 may wirelessly communicate with a plurality of information processing devices 100.

The wireless communication unit 110 is a communication interface performing wireless communication conforming to a predetermined wireless communication standard. The wireless communication unit 110 can be implemented, for example, by hardware for communication such as an ASIC (application-specific integrated circuit) for communication or a processor for communication, and firmware for communication or the like. In this embodiment, a control unit 150, described later, performs communication control processing such as transmission processing and reception processing for information, to the wireless communication unit 110, and thus enables the wireless communication unit 110 to transmit information to an external device such as the electronic device 200 and to receive information from the external device. As the predetermined wireless communication standard, a plurality of types may be employed. That is, the wireless communication unit 110 includes hardware and firmware for communication or the like corresponding to a desired wireless communication standard.

The wireless communication unit 110 can perform wireless communication conforming to a short-range wireless communication standard such as Bluetooth (trademark registered), as the predetermined wireless communication standard. In this embodiment, Bluetooth includes BLE (Bluetooth Low Energy) and may be simply referred to as BLE in the description below. For example, as shown in FIG. 1, the wireless communication unit 110 of the information processing device 100 in this embodiment includes a BLE communication unit 112 and the electronic device 200 includes a BLE communication unit 212. Thus, BLE communication can be implemented between the information processing device 100 and the electronic device 200. The BLE communication unit 112 or the like in this embodiment is in conformity with the standard of Bluetooth from version 5.1 onward. In other words, each unit included in the information processing device 100 and the electronic device 200 in this embodiment is in conformity with the standard of Bluetooth from version 5.1 onward.

The wireless communication unit 110 can also perform wireless communication conforming to, for example, Wi-Fi (trademark registered) as the predetermined wireless communication standard, in a predetermined connection mode. The predetermined connection mode is, for example, a Wi-Fi infrastructure mode. That is, as shown in FIG. 1, for example, the wireless communication unit 110 of the information processing device 100 includes a Wi-Fi communication unit 114 and the electronic device 200 includes an infrastructure mode communication unit 214. Thus, communication in the Wi-Fi infrastructure mode can be implemented via an external access point 300. In the description and illustrations below, an access point may be referred to as AP. For example, the external access point 300 periodically broadcasts a wireless communication radio wave such as a beacon in such a way that identification information of the external access point 300 can be deciphered, and connection in the Wi-Fi infrastructure mode is established by a technique, described later. The identification information of the external access point 300 is, for example, an SSID (service set identifier). In the description below, "communication connection conforming to a communication standard" is simply referred to as "connection", where appropriate. An access point can also be referred to as a router. In the case where communication in the Wi-Fi infrastructure mode has been established, connection with the external access point 300 is automatically established even if the communication is temporarily disconnected.

The predetermined connection mode may also be a Wi-Fi Direct (trademark registered) mode. In the description and illustrations below, Wi-Fi Direct may be referred to as direct connection. For example, as shown in FIG. 1, the wireless communication unit 110 of the information processing device 100 includes the Wi-Fi communication unit 114 and the electronic device 200 includes an internal access point 216. Thus, direct connection can be implemented. That is, the electronic device 200 is an owner of a group where the information processing device 100 is a client, and the internal access point 216 functions as a software access point. For example, the internal access point 216 periodically broadcasts a wireless communication radio wave such as a beacon conforming to the direct connection standard. An advertisement packet of this wireless communication radio wave includes information such as an SSID that is identification information of the internal access point 216. The Wi-Fi communication unit 114 executes a scan to receive the wireless communication radio wave broadcast from the internal access point 216. The scan in this case is a passive scan but may be an active scan. The Wi-Fi communication unit 114 makes a connection request to the internal access point 216. A signal for this connection request includes information such as a password corresponding to the SSID of the internal access point 216. This enables the connection between the Wi-Fi communication unit 114 and the internal access point 216. After communication via direct connection is established and this communication is temporarily disconnected, a user may be requested to configure a connection setting again for the reason that an encryption key is changed, or the like. The above description does not preclude the inclusion of other wireless communication modes such as an ad-hoc mode, and a connection mode based on wired communication or the like, as the predetermined connection mode. At each electronic device 200, the predetermined connection mode can be arbitrarily enabled or disabled. For example, the user can enable only the Wi-Fi infrastructure mode between the information processing device 100 and the electronic device 200.

The processing unit 120 controls the input and output of data from and to each functional unit including the foregoing wireless communication unit 110 and the display unit 160, described later, or the like. The processing unit 120 executes various kinds of computational processing, based on a predetermined program read out from a memory, not illustrated, an operation input signal from an operation unit, not illustrated, or various data or the like received via the wireless communication unit 110, and controls a display output operation to the display unit 160 or a data output operation to the electronic device 200, or the like. The predetermined program refers to, for example, basic software such as an OS (operating system), various application programs operating based on the basic software, or both of these, or the like.

The processing unit 120 can be implemented by a processor. That is, each processing in this embodiment can be implemented by a processor operating based on information such as a program, and a memory, not illustrated, storing information such as a program. The processor may be, for example, individual pieces of hardware implementing functions of individual units or may be a unified piece of hardware implementing functions of individual units. For example, the processor includes hardware and the hardware can include at least one of a circuit processing a digital signal and a circuit processing an analog signal. For example, the processor can also be formed of one or a plurality of circuit devices or one or a plurality of circuit elements installed on a circuit board. The processor may be, for example, a CPU (central processing unit). However, the processor is not limited to a CPU. Various processors such as a GPU (graphics processing unit) or a DSP (digital signal processor) can be used. The processor may also be a hardware circuit formed of an ASIC. The processor may also include an amplifier circuit and a filter circuit or the like processing an analog signal.

The processing unit 120 in this embodiment includes a search result acquisition unit 130, a direction information acquisition unit 140, and the control unit 150. That is, the information processing device 100 in this embodiment includes the search result acquisition unit 130, the direction information acquisition unit 140, and the control unit 150. For example, the processing unit 120 reads out and executes a search display application program, described later, from a memory, not illustrated, and thus implements the functions of the search result acquisition unit 130, the direction information acquisition unit 140, and the control unit 150. When an operation of this search display application program needs basic software that serves as a base, the processing unit 120 may read out a program of the basic software from a memory, not illustrated, and thus may be able to implement, for example, the function of the control unit 150.

The search result acquisition unit 130 acquires information of a search result about the electronic device 200 based on a search by the wireless communication unit 110. Specifically, for example, the BLE communication unit 212, the internal access point 216 or the like of the electronic device 200 broadcasts a wireless communication radio wave conforming to a desired wireless communication standard. The control unit 150 operating as the basic software converts the information of the search result based on information or the like included in an advertisement packet received via at least one of the BLE communication unit 112 and the Wi-Fi communication unit 114 into information corresponding to the search display application program, described later, and transmits the converted information to the search result acquisition unit 130. Thus, the search result acquisition unit 130 can acquire the information of the search result. In the description below, that the BLE communication unit 212 or the internal access point 216 of the electronic device 200 broadcasts the advertisement packet or the like may be simply described as that the electronic device 200 broadcasts the advertisement packet or the like.

The direction information acquisition unit 140 acquires direction information representing the direction in which the electronic device 200 exists, by short-range wireless communication with the electronic device 200 by the wireless communication unit 110. The acquisition of the direction information can be implemented, for example, by a technique described below. In the description below, it is assumed that the information processing device 100 and the electronic device 200 are located on the same floor as the floor where the user stands. In other words, for example, the existence of the electronic device 200 upstairs or downstairs from the floor of the building where the user is present is not taken into consideration.

For example, it is assumed that the BLE communication unit 212 of the electronic device 200 broadcasts a BLE advertisement packet, as described above, and that the BLE communication unit 112 receiving this advertisement packet includes a plurality of reception antennas. In this case, the advertisement packet reaches the individual reception antennas with a time difference. Therefore, an angle of arrival AOA of the radio wave can be estimated, based on a first computation technique using the distance between the individual antennas and the wavelength of the radio wave, which are known. The technique for estimating the angle of arrival AOA including the first computation technique is known and therefore is not described further in detail here.

The acquisition of the direction information may also be implemented, for example, by a technique described below. The BLE communication unit 212 of the electronic device 200 includes a plurality of transmission antennas and broadcasts a BLE advertisement packet while shifting the timing of transmitting the radio wave from each transmission antenna. In this case, this advertisement packet includes information of the timing when each transmission antenna transmits the advertisement packet and distance information between the individual transmission antennas. The BLE communication unit 112 can estimate an angle of departure AOD of the radio wave, based on a second computation technique using the phase difference between the advertisement packets received from the individual transmission antennas, and the information of the transmission timing and the distance information between the transmission antennas included in the advertisement packet. The technique for estimating the angle of departure AOD including the second computation technique is known and therefore is not described further in detail here.

The control unit 150 performs display control of the display unit 160, described later, based on predetermined information. The predetermined information in this case is, for example, the information of the search result, but may be the direction information, described later, or may be other information. For example, the control unit 150 can display a list of electronic devices 200 on the display unit 160. That is, the control unit 150 in this embodiment displays a list of a plurality of electronic devices 200 found by the search, on the display unit 160, described later, based on the information of the search result. The control unit 150 may also function as basic software or the like, as described above.

The display unit 160 is formed of a display or the like displaying various kinds of information to the user. The display unit 160 can be implemented, for example, by a liquid crystal display, and may be implemented by an organic EL display, a dot matrix LED or the like. Also, the display unit 160 and an operation unit, not illustrated, can be formed as an integrated piece of hardware, for example, in the form of a touch panel.

An example of processing in the technique according to this embodiment will now be described, using the flowchart of FIG. 2. For example, the information processing device 100 generates timer interrupt processing every predetermined time from the timing when the user starts the search display application program, and thus repeatedly executes the processing shown in FIG. 2. However, this is not limiting. For example, the information processing device 100 may repeatedly execute the processing shown in FIG. 2 by loop processing.

The information processing device 100 executes search processing (step S100). For example, when the information processing device 100 and the electronic device 200 wirelessly communicate with each other in conformity with the BLE standard, identification information of the electronic device 200 is included in a BLE advertisement packet and the information processing device 100 receives the advertisement packet. Thus, the search processing (step S100) can be implemented. The identification information of the electronic device 200 is specifically, for example, a MAC address of the electronic device 200 stored in a payload of a protocol data unit in the advertisement packet, but may be other information that is interconvertible with the MAC address, such as a serial number. In this embodiment, the payload may further include other information. This other information is, for example, information of radio wave intensity, information representing the state of the electronic device 200, or the like. Details thereof will be described later.

Meanwhile, for example, when the information processing device 100 is connected to the external access point 300 by the Wi-Fi infrastructure mode, the Wi-Fi communication unit 114 may search for the electronic device 200 on a network formed by the external access point 300. More specifically, for example, the Wi-Fi communication unit 114 transmits a response request packet designating a broadcast address or a link-local multicast address to the infrastructure mode communication unit 214 of the electronic device 200. The response request packet is a packet requesting a device receiving this packet to send back a response packet including the identification information of the device. The infrastructure mode communication unit 214 sends back a response packet including the identification information such as the SSID of its own device to the information processing device 100. Thus, the search processing (step S100) can be implemented.

Subsequently, the information processing device 100 executes direction information acquisition processing (step S200). For example, when the BLE communication unit 112 of the wireless communication unit 110 receives an advertisement packet conforming to the BLE standard from the BLE communication unit 212 of the electronic device 200, the control unit 150 calculates the angle of arrival AOA or the angle of departure AOD that is estimated in the manner described above. The control unit 150 then executes processing of converting the received information based on the angle of arrival AOA or the angle of departure AOD into the direction information corresponding to the search display application program, described later, and transmits the direction information to the direction information acquisition unit 140. For example, the control unit 150 executes processing of converting the angle of arrival AOA or the angle of departure AOD, which is relative information found based on the information processing device 100 or the electronic device 200 as a reference point, in such a way as to correspond to absolute information such as an azimuth. Thus, the direction information acquisition processing (step S200) can be implemented.

Subsequently, the information processing device 100 executes display priority order decision processing (step S300). For example, it is assumed that a table where the direction of the electronic device 200 and the priority rank of the direction are associated with each other is stored in a memory, not illustrated. The direction corresponding to the priority rank stored in the table is decided, for example, based on the direction in which an antenna, not illustrated, of the information processing device 100 faces as a reference position. The direction in which the antenna faces can be grasped as an absolute azimuth via a gyro sensor or the like, not illustrated, of the information processing device 100. Any "direction" in the description below can be similarly grasped as an absolute azimuth. The control unit 150 executes, for example, processing of associating a plurality of electronic devices 200 searched out by the search processing (step S100) with the information of the direction of each electronic device 200 acquired by the direction information acquisition processing (step S200). The control unit 150 then executes processing of ranking each electronic device 200 in such a way that the associated information of the direction of the electronic device 200 corresponds to the priority rank of the direction in the table. Thus, the display priority order decision processing (step S300) can be implemented.

The priority rank of the direction can be suitably set, for example, by the user. However, for example, a predetermined priority rank may be set as an initial setting. As the predetermined priority rank, for example, the direction in which the top end of the information processing device 100 faces is defined as a first priority direction with the highest degree of priority and the opposite direction is defined as a second priority direction with the lowest degree of priority, or the like. Also, for example, a suitable degree of priority may be able to be set additionally for each of directions spaced apart from each other every predetermined angle between the first priority direction and the second priority direction.

Subsequently, the information processing device 100 executes display processing (step S400). Specifically, for example, the control unit 150 displays information about a plurality of electronic devices 200 with the priority ranks thereof on the display unit 160, based on the display priority order decided in the display priority order decision processing (step S300). For example, it is assumed that four electronic devices 200, that is, an electronic device 200-1, an electronic device 200-2, an electronic device 200-3, and an electronic device 200-4, are searched out in the search processing (step S100). It is also assumed that that the control unit 150 decides that, from the highest degree of priority based on the direction information, the electronic devices 200 are ranked in the order of the electronic device 200-1, the electronic device 200-4, the electronic device 200-2, and the electronic device 200-3 in the display priority order decision processing (step S300). Thus, in a screen example of the search display application, the information about the electronic devices 200 is displayed on the display unit 160 in the order of the electronic device 200-1, the electronic device 200-4, the electronic device 200-2, and the electronic device 200-3, as indicated by A11, A12, A13, A14 in FIG. 3.

As described above, the example of processing shown in FIG. 2 is periodically repeated. Therefore, due to a predetermined circumstance, the display example in FIG. 3 is periodically updated and the display content may be changed. The predetermined circumstance is, for example, a circumstance where the power of one of the electronic devices 200 has turned on or off, a circumstance where the electronic device 200 has unexpectedly malfunctioned, a circumstance where the information processing device 100 or the electronic device 200 has moved, resulting in a change in the information of distance and direction, or the like. The same applies to display examples in modification examples or the like, described later.

As described above, the information processing device 100 in this embodiment wirelessly communicates with the electronic device 200 via the wireless communication unit 110 and includes the search result acquisition unit 130, the direction information acquisition unit 140, and the control unit 150. The search result acquisition unit 130 acquires information of a search result about the electronic device 200 by a search via the wireless communication unit 110. The direction information acquisition unit 140 acquires direction information representing a direction in which the electronic device 200 exists, by short-range wireless communication with the electronic device 200 via the wireless communication unit 110. The control unit 150 executes processing of displaying, on the display unit 160, a list of a plurality of the electronic devices 200 found by the search, based on the information of the search result, then deciding a display priority order of the electronic device 200, based on the direction information, and displaying information of the electronic device 200 on the display unit 160, based on information of the display priority order. In this way, the information processing device 100 in this embodiment includes the wireless communication unit 110 and thus can wirelessly communicate with the electronic device 200. The information processing device 100 also includes the search result acquisition unit 130 and the direction information acquisition unit 140 and thus can acquire the search result and the direction information of the electronic device 200, based on the wireless communication. The information processing device 100 also includes the control unit 150 and the control unit 150 decides the display priority order of the electronic device 200, based on the search result and the direction information and thus can display the information of a plurality of electronic devices 200 based on the display priority order, as a list on the display unit 160. Thus, the user can grasp the display priority order of the electronic device 200 based on the search result and the direction information. Therefore, the user can properly determine the electronic device 200 to select from among the plurality of electronic devices 200 displayed in the list.

Up to now, the information processing device 100 deciding the display order of the electronic device 200, based on the direction information, has not been proposed. For example, in FIG. 4, it is assumed that the electronic devices 200-1 to 200-4 are located at fixed locations and that the distances which a wireless communication radio wave needs to travel between the location of the user and the information processing device 100 and the locations of the electronic devices 200-1 to 200-4 are the same. The term "same" in this case includes "substantially the same". It is also assumed that, for example, a partition as indicated by P exists between the user and the information processing device 100, and the electronic devices 200-1 to 200-4. In such a case, the distance which the user needs to move from the location where the information processing device 100 exists toward the locations where the electronic devices 200-1 to 200-4 exist to reach there varies depending on which one of the electronic devices 200-1 to 200-4 is employed. For example, a direction DR1 is a direction toward the electronic device 200-1 that is located in front of the user and that can be reached at the shortest distance. Therefore, the direction DR1 is considered to be a direction with a high priority rank. Meanwhile, for example, a direction DR3 is a direction from the user toward the electronic device 200-3, which is the most difficult to reach by the user. Therefore, the direction DR3 is considered to be a direction with a low priority rank. In this way, the direction information can be useful information for the user when the user selects one electronic device 200 from among a plurality of candidate electronic devices 200. In the description and illustrations below, it is assumed that the antenna, not illustrated, of the information processing device 100 faces upward on the sheet.

The technique in this embodiment may be implemented as a program. That is, the program in this embodiment causes a computer to operate as the wireless communication unit 110 wirelessly communicating with the electronic device 200, the search result acquisition unit 130, the direction information acquisition unit 140, and the control unit 150. The search result acquisition unit 130 acquires information of a search result about the electronic device 200 searched out by the wireless communication unit 110. The direction information acquisition unit 140 acquires direction information representing a direction in which the electronic device 200 exists, by short-range wireless communication with the electronic device 200 via the wireless communication unit 110. The control unit 150 executes processing of displaying, on the display unit 160, a list of a plurality of the electronic devices 200 found by the search, based on the information of the search result, then deciding a display priority order of the electronic device 200, based on the direction information, and displaying information of the electronic device 200 on the display unit 160, based on information of the display priority order. Thus, an effect similar to the foregoing effect can be achieved.

The electronic device 200-1 as a specific example of the electronic device 200 is simply referred to as an electronic device 1 when displayed on the display unit 160. The same applies to the other electronic devices 200 such as the electronic device 200-2. The electronic devices 200 are similarly referred to in FIGS. 5, 7, 8, 9, 11, 12, 13, 14, and 15 given below.

In the description below, the Wi-Fi infrastructure mode, which is a wireless LAN, and the direct connection mode, are employed as an example of the wireless communication, and Bluetooth is employed as an example of the short-range wireless communication. That is, in the information processing device 100 in this embodiment, the information of the search result is information acquired via one of the wireless LAN infrastructure mode, the direct connection mode, and the short-range wireless communication by the wireless communication unit 110, and the short-range wireless communication is Bluetooth communication. Thus, a system for displaying the information of the search result about the electronic device 200 at the information processing device 100 can be constructed, using Wi-Fi, which is a wireless LAN, and Bluetooth.

Figure 5:
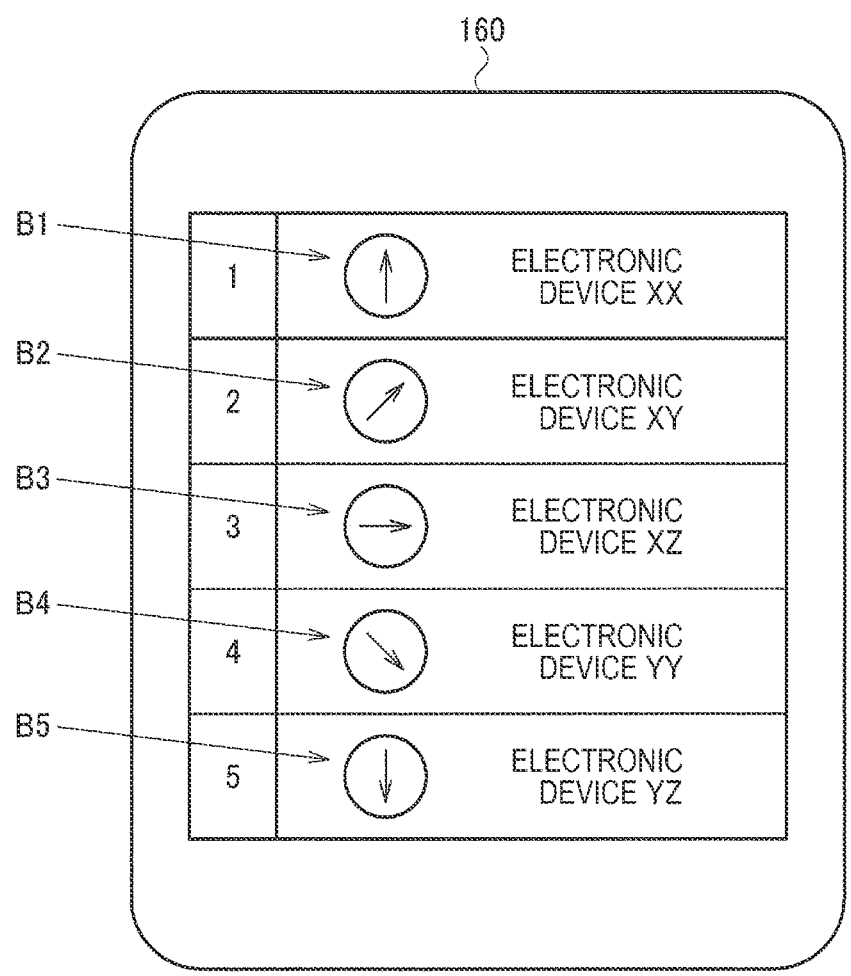
FIG. 5 explains another display example in the embodiment.

As a technique for deciding a display priority order, for example, a predetermined direction may be set as a top-priority direction and the electronic devices 200 located in directions close to the predetermined direction may be displayed in order. When the upward direction on the sheet is defined as the predetermined direction, an electronic device 200-XX located in the same direction as the upward direction on the sheet is displayed in the list as the electronic device 200 with the highest degree of priority, as indicated by B1 in FIG. 5. Then, the control unit 150 displays the electronic devise 200 in the list in the order of an electronic device 200-XY, an electronic device 200-XZ, an electronic device 200-YY, and an electronic device 200-YZ located in directions close to the predetermined direction, as indicated by B2, B3, B4, B5. As described above, in the information processing device 100 in this embodiment, the control unit 150 displays the electronic devices 200 in a list in the order from the electronic device 200 whose direction detected based on the information of the display priority order is close to the predetermined direction. Thus, the user can grasp the electronic device 200 located in the predetermined direction or in a direction close to the predetermined direction. Therefore, the user can properly select the electronic device 200. The icons indicated by B1 to B5 in FIG. 5 are similar to icons indicated by A21 to A24 in FIG. 3 and will be described in detail later.

The predetermined direction may be set, based on an input from the user. For example, when the arrangement of the partition indicated by P in FIG. 4 is changed, the direction of a high priority rank may be changed. Therefore, it is convenient if the user can set the predetermined direction each time. The user may also be able to set a plurality of predetermined directions. For example, it is assumed that the user has set the direction DR1 in FIG. 4 as a first predetermined direction. In this case, in FIG. 4, a direction DR2 and a direction DR4 are directions at 90 degrees from the first predetermined direction. The electronic device 200-2 is located in the direction DR2. The electronic device 200-4 is located in the direction DR4. In this case, the user is expected to determine that the degree of priority of the direction DR4 is higher than the degree of priority of the direction DR2 for a reason such as that moving to the location where the electronic device 200-4 exists is easier than moving to the location where the electronic device 200-2 exists. Therefore, the user can set the direction DR4 as a second predetermined direction and thus can display the electronic device 200-4 with a higher degree of priority than the electronic device 200-2 in the list, for example, as indicated by A12 and A13 in FIG. 3. Similarly, the user may set the direction DR2 as a third predetermined direction and may set the direction DR3 as a fourth predetermined direction. In other words, the user may be able to set the degree of priority of the direction, for example, as the direction DR1>the direction DR4>the direction DR2>the direction DR3. As described above, in the information processing device 100 in this embodiment, the control unit 150 sets a predetermined direction, based on input information from the user. Thus, the user can grasp the electronic device 200 located in the predetermined direction or in a direction close to the predetermined direction, based on the user's own setting.

Also, for example, as the information of the electronic device 200 displayed on the display unit 160, a direction image showing the direction of the electronic device 200 may be additionally displayed as an icon. Specifically, for example, as indicated by A21 in FIG. 3, an icon including an arrow facing the same direction as the direction DR1 is displayed in the area where the information of the electronic device 200-1 is displayed. Also, as indicated by A22, an icon including an arrow facing the same direction as the direction DR4 is displayed in the area where the information of the electronic device 200-4 is displayed. Similarly, as indicated by A23, an icon including an arrow facing the same direction as the direction DR2 is displayed in the area where the information of the electronic device 200-2 is displayed. As indicated by A24, an icon including an arrow facing the same direction as the direction DR3 is displayed in the area where the information of the electronic device 200-3 is displayed. In this way, in the information processing device 100 in this embodiment, the control unit 150 displays a direction image showing the direction of the electronic device 200 at the position corresponding to the area showing the electronic device 200 in the displayed list. Thus, the user can visually grasp the direction information corresponding to each electronic device 200. The user can also grasp a direction with a high degree of priority and the priority rank thereof.

Figure 2:
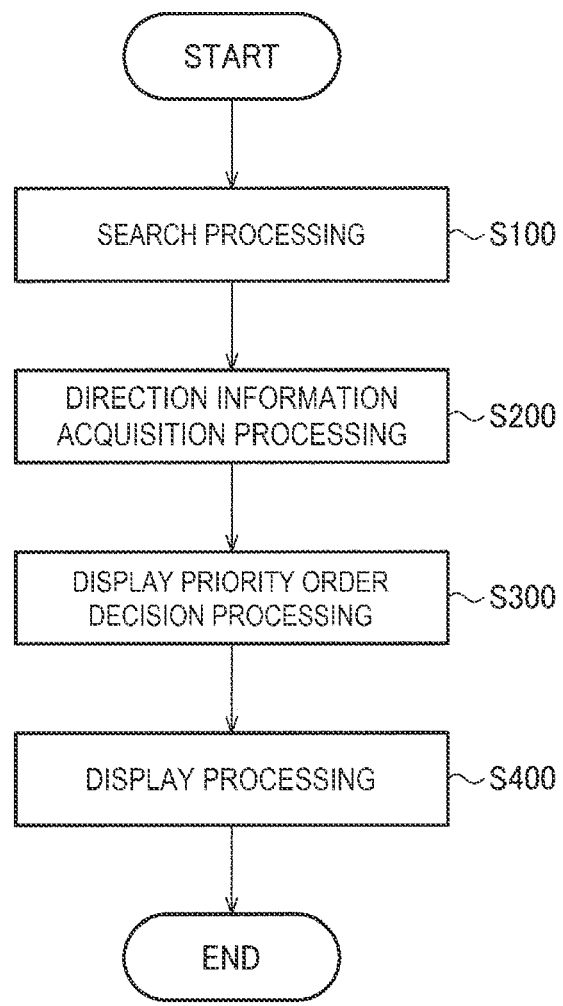
FIG. 2 is a flowchart explaining an example of processing by the information processing device.
Figure 3:
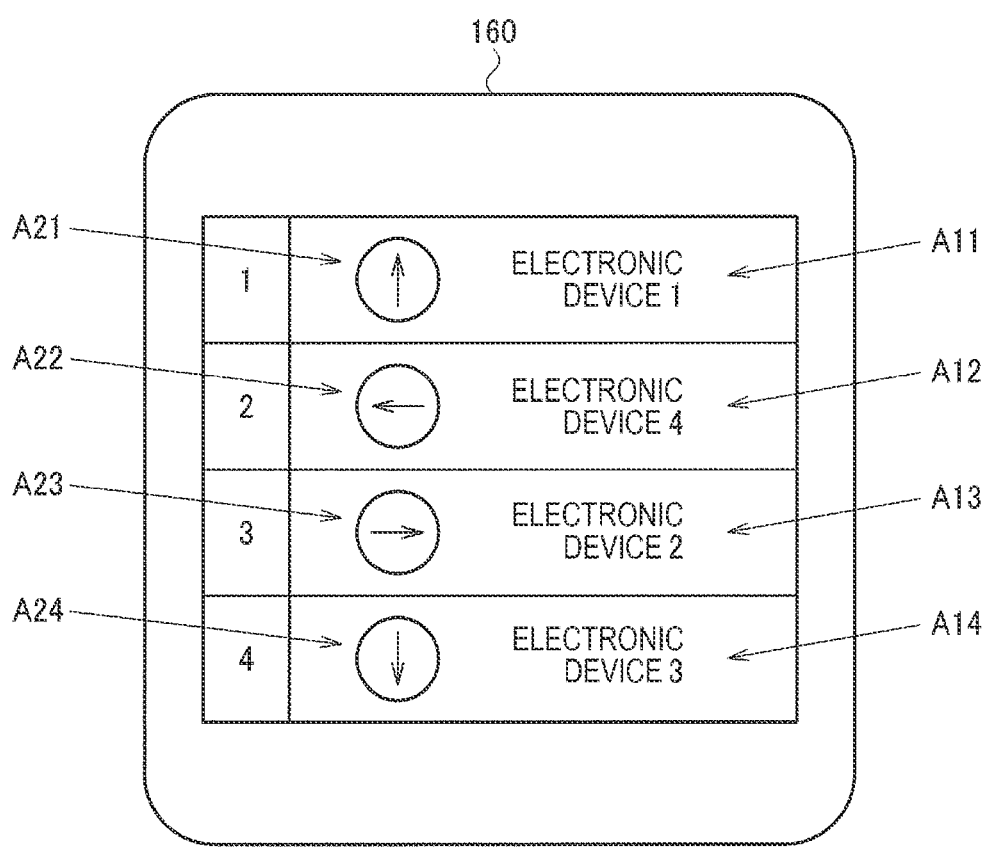
FIG. 3 explains a display example in the embodiment.
Figure 4:
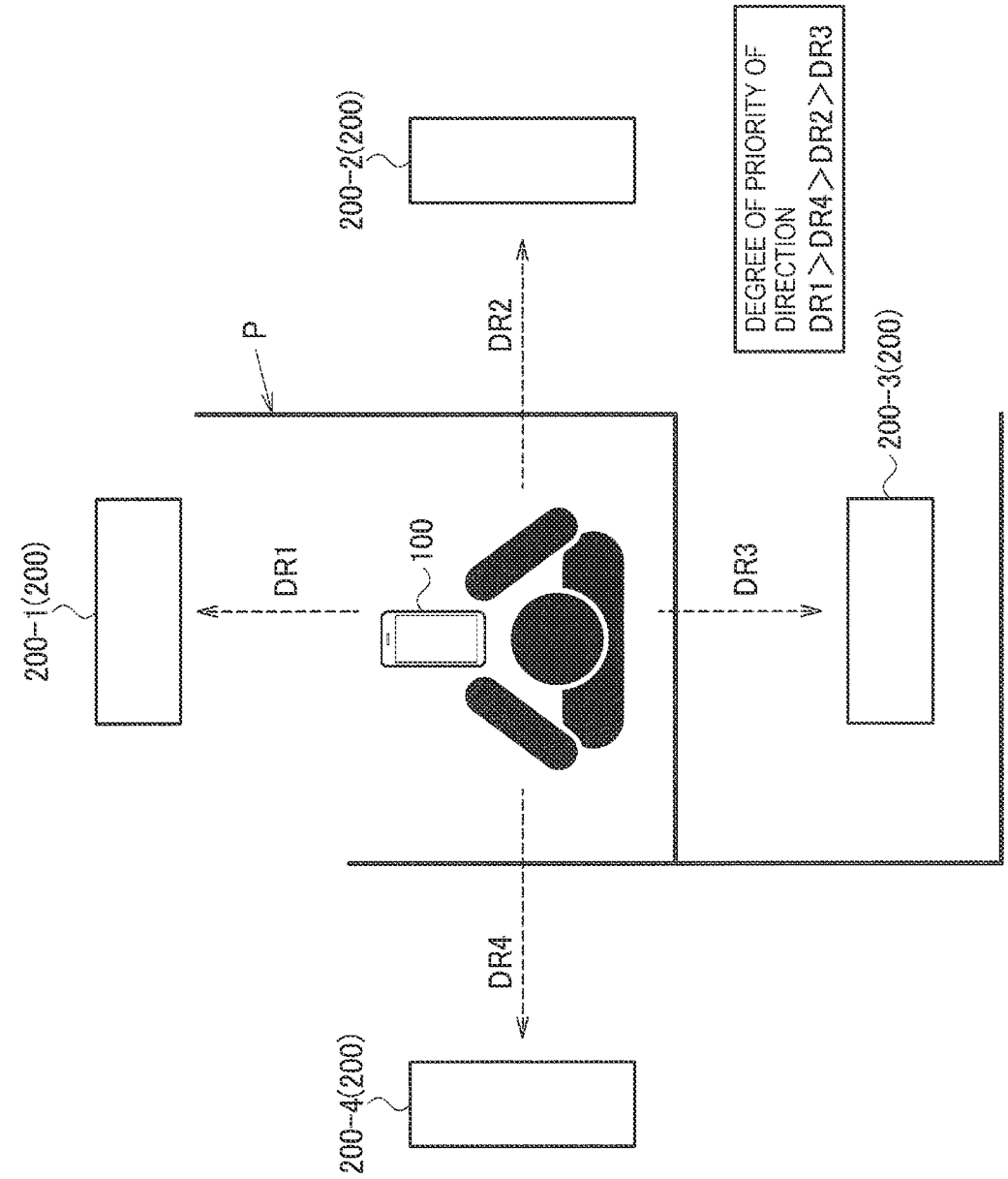
FIG. 4 explains the degree of priority of a direction.

The display example in FIG. 3 can be implemented, for example, by the control unit 150 executing processing of creating an icon of a direction image based on the direction information acquired by the direction information acquisition processing (step S200) in FIG. 2 and processing of displaying the created icon along with the corresponding electronic device 200. Alternatively, a plurality of types of icons may be stored in a memory, not illustrated. Thus, the display shown in FIG. 3 can be implemented by the control unit 150 executing processing of selecting an icon corresponding to the direction information acquired by the direction information acquisition processing (step S200) in FIG. 2 and processing of displaying the selected icon along with the corresponding electronic device 200.

It is described above that the search processing (step S100) in FIG. 2 can be implemented by wireless communication conforming to the BLE standard or wireless communication conforming to the Wi-Fi standard. However, the search processing (step S100) may be executed by both of these types of wireless communication. In this case, the control unit 150 may execute the display processing (step S400) in such a way as to display search results in one list instead of separately displaying a list of search results based on wireless communication conforming to the BLE standard and a list of search results based on wireless communication conforming to the Wi-Fi standard. For example, though the illustration of a flowchart is omitted, the control unit 150 executes processing of creating a list of search results based on wireless communication conforming to the Wi-Fi standard and subsequently executes processing of comparing first identification information, which is the identification information of the electronic device 200 given in the list, with second identification information, which is the identification information of the electronic device 200 given in the search results based on wireless communication conforming to the BLE standard. When the first identification information and the second identification information are the same, the control unit 150 then executes processing of adding a direction image corresponding to the electronic device 200 given in the list. Meanwhile, when the first identification information and the second identification information differ from each other, the control unit 150 executes processing of adding information of the electronic device 200 searched out by wireless communication conforming to the BLE standard and a direction image, to the list. That is, in the information processing device 100 in this embodiment, the control unit 150 executes processing of establishing a correspondence between the first identification information included in the information of the search result acquired from the electronic device 200 based on the search by the wireless communication unit 110 and the second identification information of the electronic device 200 whose direction information is acquired by short-range wireless communication. The control unit 150 then executes processing of performing a display in which the direction image or the like, that is, the information of the direction to which the second identification information corresponds, and the electronic device 200, correspond to each other, based on the above processing. Thus, when a search based on a plurality of types of wireless communication including short-range wireless communication is performed, a list of search results can be properly displayed.

The technique in this embodiment is not limited to the above and can be implemented with various modifications. For example, as a modification example, the display order of the electronic devices 200 given in the list may be decided, based on information of the distance between the information processing device 100 and the electronic device 200. The control unit 150 can acquire the information of the distance between the information processing device 100 and the electronic device 200, for example, based on the intensity or the like of a radio wave in each wireless communication received by the wireless communication unit 110. In other words, in the information processing device 100 in this embodiment, the control unit 150 acquires information of the radio wave intensity of the radio wave transmitted from the electronic device 200, by short-range wireless communication with the electronic device 200, and decides the order of displaying the electronic device 200 in the list according to the distance decided based on the information of the radio wave intensity. Thus, the user can grasp the display order based on the distance to each electronic device 200.

For example, when the BLE communication unit 112 of the wireless communication unit 110 receives a radio wave based on BLE, a BLE advertisement packet includes reference radio wave intensity information and therefore the control unit 150 can acquire the information of the distance between the information processing device 100 and the electronic device 200. The reference radio wave intensity is the received signal strength indication (RSSI) of a beacon signal at a receiving-side device installed at a location away from a transmitting-side device of the beacon signal by a reference distance. The radio wave intensity is in inverse proportion to the square of the distance. Therefore, if the radio wave intensity at the reference distance is known, the control unit 150 can compute information about the distance between the information processing device 100 and the electronic device 200 or the like, based on the radio wave intensity of the BLE beacon signal actually received by the BLE communication unit 112. The information about the distance between the information processing device 100 and the electronic device 200 or the like may be, for example, a specific distance such as "1.5 m" or may be information of a distance range group, described later with reference to FIG. 6 or the like.

Figure 6:
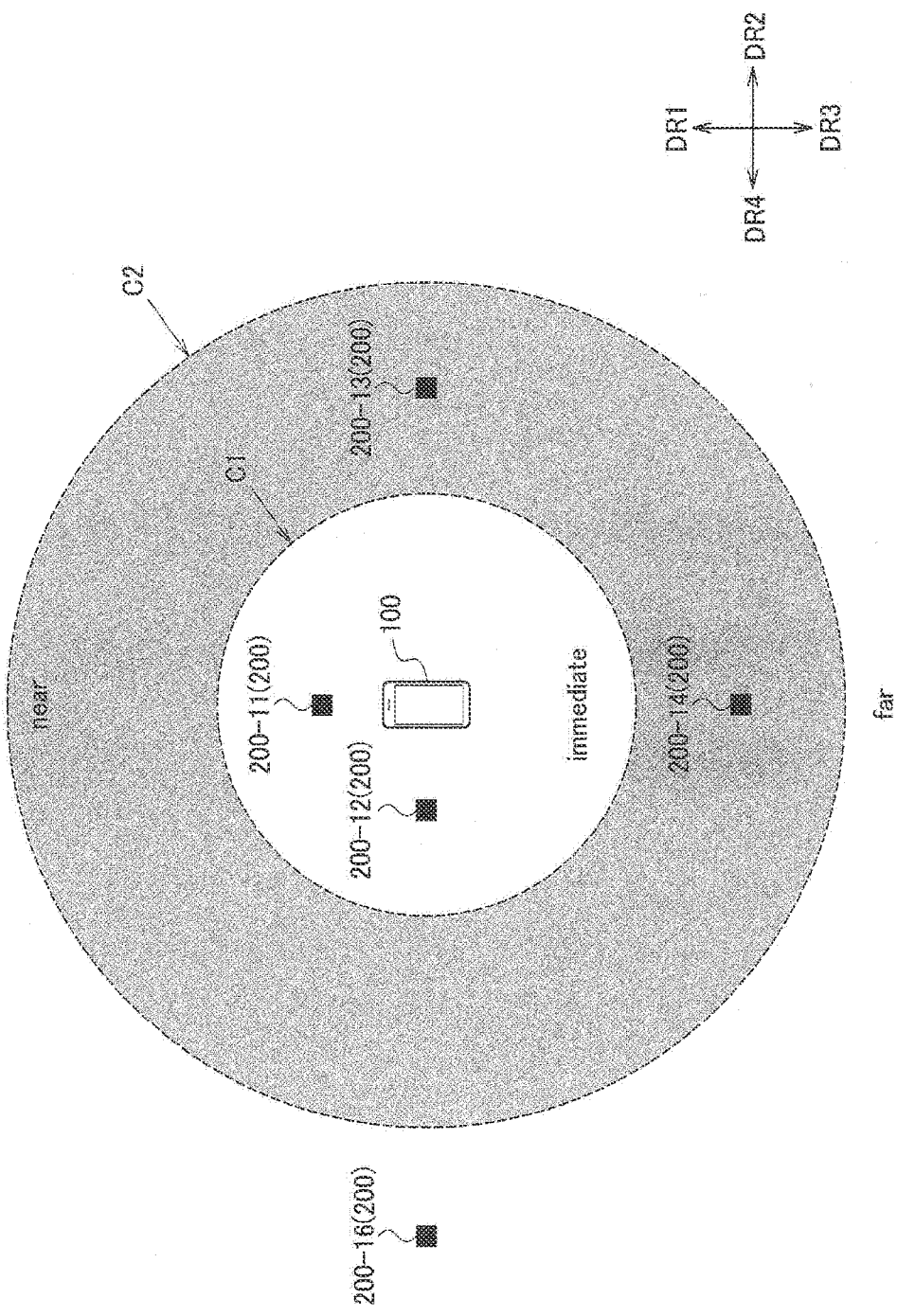
FIG. 6 explains a distance range group in a modification example.

An example where the information processing device 100 displays the information of the distance range group in the list will now be described, using FIGS. 6, 7, 8, and 9. For example, in FIG. 6, a first distance range group, which is a range at a first predetermined distance from the information processing device 100, as indicated by C1, is defined as "immediate". A second distance range group, which is a range at a second predetermined distance longer than the first predetermined distance and which excludes the range at the first predetermined distance, as indicated by C2, is defined as "near". A third distance range group, which is outside of these ranges, is defined as "far". The direction DR1, the direction DR2, the direction DR3, and the direction RD4 in FIG. 6 are the same as the direction DR1, the direction DR2, the direction DR3, and the direction RD4 in FIG. 4. In FIG. 6, the illustration of the partition indicated by P in FIG. 4 is omitted. In FIG. 6, it is assumed that an electronic device 200-11 and an electronic device 200-12 are located within the range of the first distance range group defined as "immediate". Similarly, it is assumed that an electronic device 200-13 and an electronic device 200-14 are located within the range of the second distance range group defined as "near". It is assumed that an electronic device 200-15 and an electronic device 200-16 are located within the range of the third distance range group defined as "far".

Figure 7:
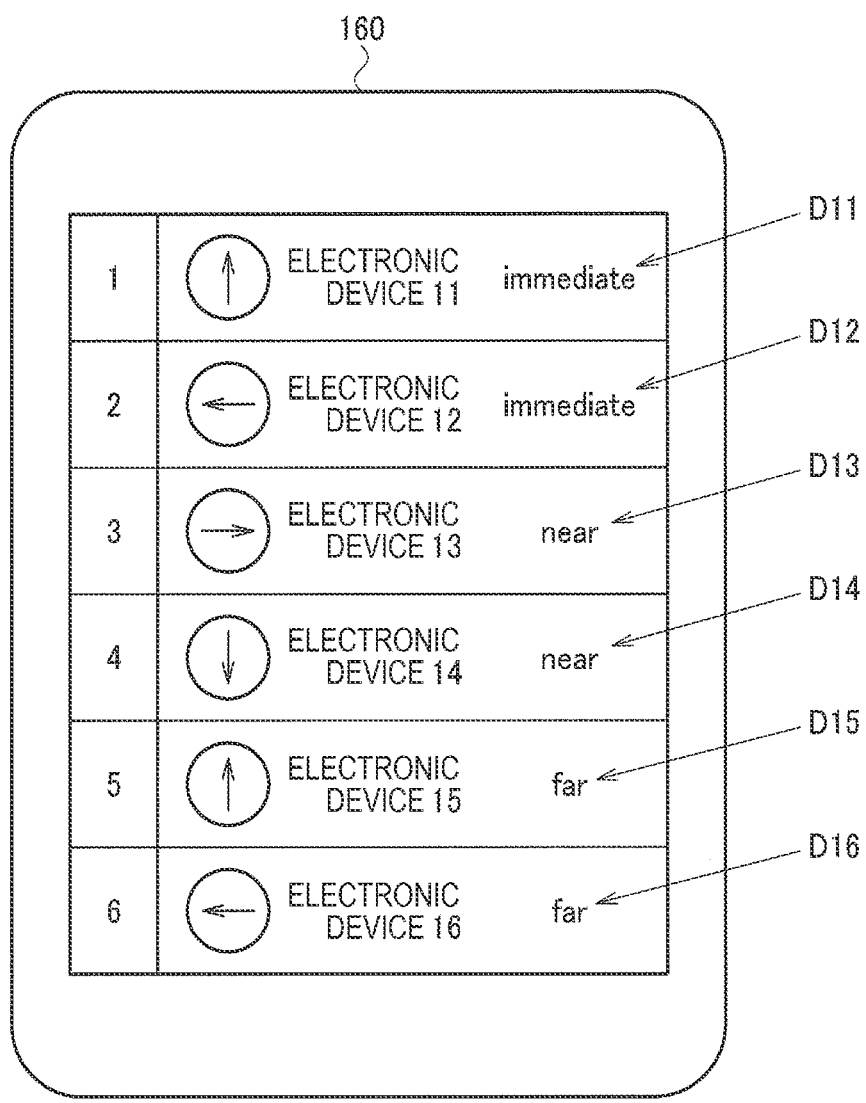
FIG. 7 explains a display example in the modification example.
Figure 8:
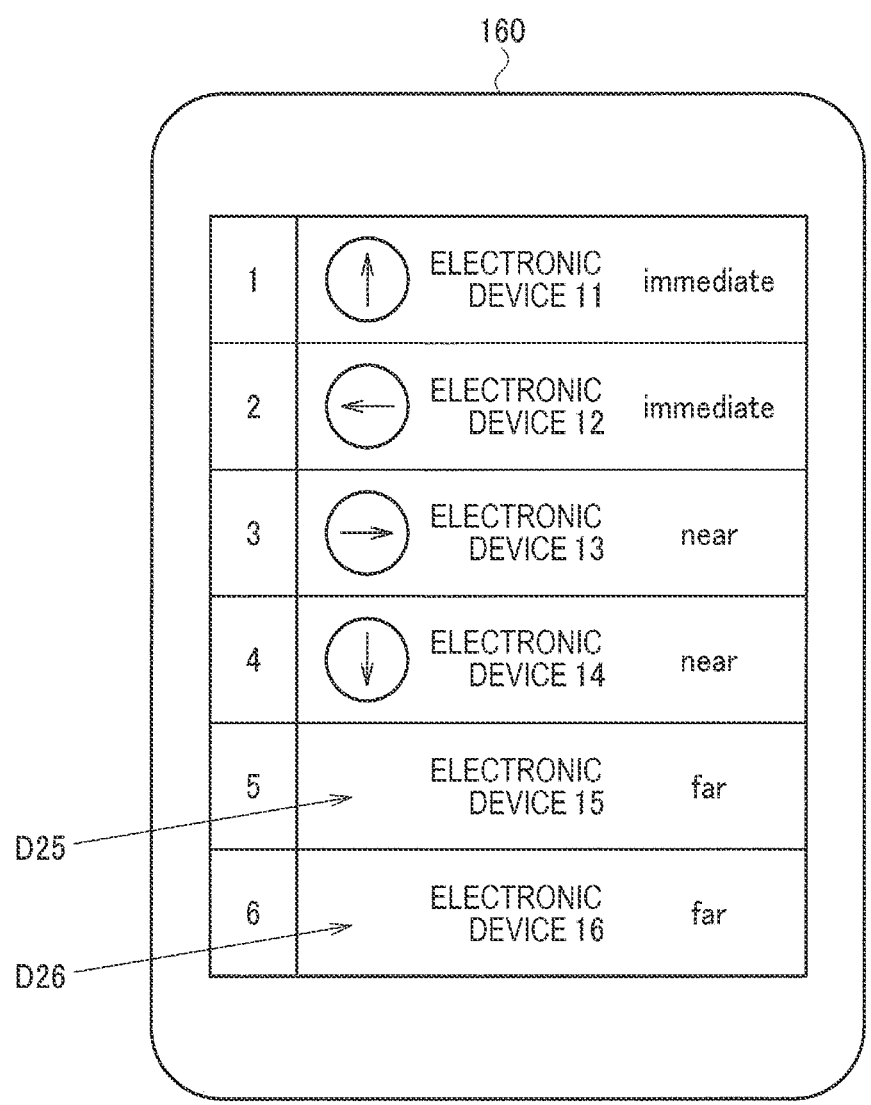
FIG. 8 is another view explaining the display example in the modification example.
Figure 9:
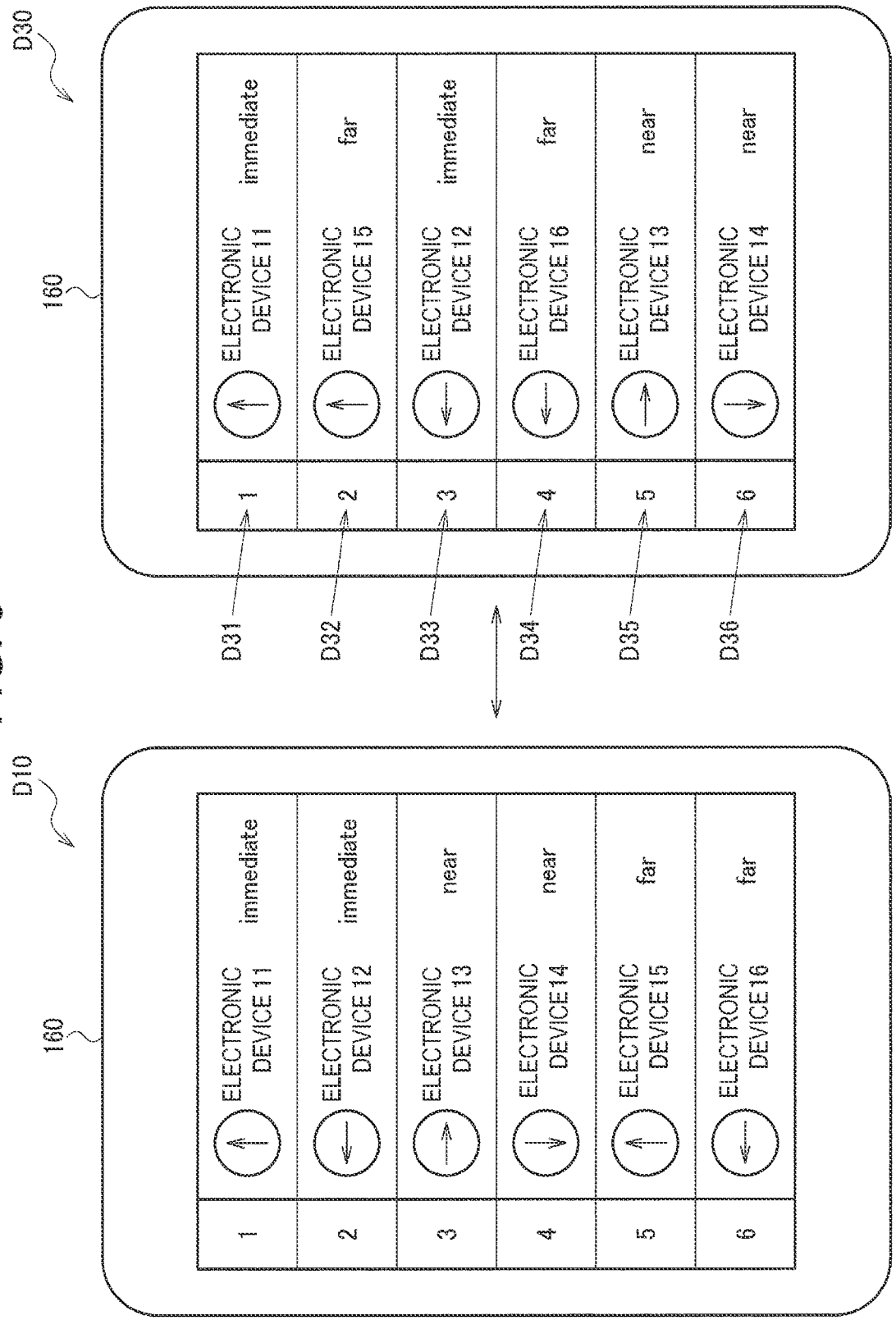
FIG. 9 is another view explaining the display example in the modification example.

In this case, in the list displayed on the display unit 160, "immediate" corresponding to the first distance range group is displayed in an area where the information of the electronic device 200-11 is displayed, as indicated by D11 in FIG. 7. Similarly, "immediate" corresponding to the first distance range group is displayed in an area where the information of the electronic device 200-12 is displayed, as indicated by D12. Also, "near" corresponding to the second distance range group is displayed in an area where the information of the electronic device 200-13 is displayed, as indicated by D13. Similarly, "near" corresponding to the second distance range group is displayed in an area where the information of the electronic device 200-14 is displayed, as indicated by D14. Also, "far" corresponding to the third distance range group is displayed in an area where the information of the electronic device 200-15 is displayed, as indicated by D15. Similarly, "far" corresponding to the third distance range group is displayed in an area where the information of the electronic device 200-16 is displayed, as indicated by D16. That is, in a display example shown in FIG. 7, the electronic devices 200 are displayed as classified into distance range groups and the distance range groups are displayed in the order of "immediate", "near", and "far". This is because the electronic device 200 at a short distance from the information processing device 100 is considered to have a reason to be given a high degree of priority. As described above, in the information processing device 100 in this embodiment, the control unit 150 classifies the electronic devices 200 that are found, into a plurality of distance range groups, and displays the classified electronic devices 200 in a list. Thus, the user can visually grasp the distance range group corresponding to each electronic device 200. The number of distance range groups is three in FIG. 6 or the like but may be two or less and may be four or more.

The information processing device 100 may also display an icon of the direction image described above with reference to FIG. 3 or the like, or may decide the display order of the electronic device 200, based on the direction information corresponding to the icon. Specifically, for example, it is assumed that the user sets the degree of priority of the direction as the direction DR1>the direction DR4>the direction DR2>the direction DR3, as described above with reference to FIG. 4 or the like. As shown in FIG. 6, the electronic device 200-11 and the electronic device 200-12 belong to the same distance range group of "immediate", but the electronic device 200-11 is located at a location in the direction DR1 from the information processing device 100, whereas the electronic device 200-12 is located at a location in the direction DR4 from the information processing device 100. Therefore, in consideration of the degree of priority of the direction, the electronic device 200-11 and the electronic device 200-12 are displayed on the display unit 160 in such a way that the degree of priority of the display of the electronic device 200-11 is higher than the degree of priority of the display of the electronic device 200-12, as indicated by D11, D12 in FIG. 7. Similarly, the electronic device 200-13 and the electronic device 200-14 belong to the same distance range group of "near", but the electronic device 200-13 is located at a location in the direction DR2 from the information processing device 100, whereas the electronic device 200-14 is located at a location in the direction DR3 from the information processing device 100. Therefore, in consideration of the degree of priority of the direction, the electronic device 200-13 and the electronic device 200-14 are displayed on the display unit 160 in such a way that the degree of priority of the display of the electronic device 200-13 is higher than the degree of priority of the display of the electronic device 200-14, as indicated by D13, D14 in FIG. 7. Similarly, the electronic device 200-15 and the electronic device 200-16 belong to the same distance range group of "far", but the electronic device 200-15 is located at a location in the direction DR1 from the information processing device 100, whereas the electronic device 200-16 is located at a location in the direction DR4 from the information processing device 100. Therefore, in consideration of the degree of priority of the direction, the electronic device 200-15 and the electronic device 200-16 are displayed on the display unit 160 in such a way that the degree of priority of the display of the electronic device 200-15 is higher than the degree of priority of the display of the electronic device 200-16, as indicated by D15, D16 in FIG. 7.

As described above, in the information processing device 100 in this embodiment, the control unit 150 displays, in a list, the electronic device 200 found based on the direction information, in each of a plurality of distance range groups. Thus, the user can grasp the display order of the electronic device 200, based on both of the information of the distance range group and the direction information. Also, the user cannot determine, for example, which of the electronic device 200-11 and the electronic device 200-12 is at the shortest distance from the information processing device 100, based on the display example in FIG. 7. However, if the distance range group to which the electronic device 200 belongs is, for example, "immediate", it suffices to display the display example in FIG. 7 on the display unit 160 to the user wanting to grasp the electronic device 200 located in a desired direction.

In this modification example, the information processing device 100 need not display the icon of the direction image for all the electronic devices 200 and may not display the icon of the direction image, for example, for the electronic device 200 belonging to a predetermined distance range group. For example, the information processing device 100 may hide the icon of the direction image for the electronic device 200-15 and the electronic device 200-16 belonging to the distance range group of "far", as indicated by D25, D26 in FIG. 8. This is because it is assumed that the electronic device 200 far from the information processing device 100 is less likely to be selected by the user and that there is little need for the user to grasp the direction information of this electronic device 200. As described above, in the information processing device 100 in this embodiment, the control unit 150 does not display an image based on the direction information for the electronic device 200 in a far distance range, of a plurality of distance range groups. Thus, the user can select the electronic device 200, based on a proper amount of information.

The information processing device 100 may be configured to be able to switch the display example shown in FIG. 7, based on a priority item. Specifically, for example, the user may be able to switch between a screen example indicated by D10 and a screen example indicated by D30 in FIG. 9, by operating an operation unit, not illustrated, or the like. In the screen example indicated by D10, which is the same as FIG. 7, the electronic devices 200 are displayed as classified into the distance range groups, and the distance range groups are displayed in the order of "immediate", "near", and "far". Meanwhile, in the screen example indicated by D30, the electronic devices 200 are displayed as classified by the degree of priority of the direction. That is, in the screen example indicated by D30, the electronic devices 200 are displayed in the order of the direction DR1, the direction DR4, the direction DR2, and the direction DR3.

In the screen example indicated by D30, for example, the electronic device 200-11 and the electronic device 200-15 are located at locations in the direction DR1 from the information processing device 100 but differ from each other in that the electronic device 200-11 belongs to the distance range group of "immediate", whereas the electronic device 200-15 belongs to the distance range group of "far". In this case, the degree of priority of "immediate" is considered to be higher than the degree of priority of "far", as in FIG. 7 or the like. Therefore, the information of the electronic device 200-11 is displayed preferentially over the information of the electronic device 200-15, as indicated by D31, D32. Also, for example, the electronic device 200-12 and the electronic device 200-16 are located at locations in the direction DR4 from the information processing device 100 but differ from each other in that the electronic device 200-12 belongs to the distance range group of "immediate", whereas the electronic device 200-16 belongs to the distance range group of "far". Therefore, similarly, the information of the electronic device 200-12 is displayed preferentially over the information of the electronic device 200-16, as indicated by D33, D34. The electronic device 200-13 located at the location in the direction DR2 is displayed next to the electronic device 200-16, as indicated by D35. Similarly, the electronic device 200-14 located at the location in the direction DR3 is displayed next to the electronic device 200-13, as indicated by D36. As described above, in the information processing device 100 in this embodiment, based on input information from the user, the control unit 150 executes processing of switching between a list displaying the electronic device 200 found based on the direction information and a list displaying the electronic device 200 found based on the distance information. Thus, the user can properly display a list, based on information to be emphasized. For example, in the circumstance where the user moves to and from a place where the partition indicated by P in FIG. 4 exists and a place where the partition does not exist, the information to be emphasized in searching for the electronic device 200 changes periodically and therefore it is convenient for the user to be able to properly switch the display.

The technique in this embodiment is not limited to the above and can be implemented with various modifications. For example, as another modification example, the form of the icon of the direction image may be able to be changed according to the distance between the information processing device 100 and the electronic device 200. Specifically, for example, in FIG. 10, it is assumed that an electronic device 200-21 is located at a location at a fourth predetermined distance from the information processing device 100 and that an electronic device 200-22 is located at a location at a fifth predetermined distance longer than the fourth predetermined distance from the information processing device 100. Similarly, it is assumed that an electronic device 200-23 is located at a location at a sixth predetermined distance longer than the fifth predetermined distance from the information processing device 100 and that an electronic device 200-24 is located at a location at a seventh predetermined distance longer than the sixth predetermined distance from the information processing device 100. It is also assumed that the electronic device 200-21 is located in the direction DR1 from the information processing device 100, that the electronic device 200-22 is located in the direction DR4 from the information processing device 100, that the electronic device 200-23 is located in the direction DR2 from the information processing device 100, and that the electronic device 200-24 is located in the direction DR3 from the information processing device 100.

Figure 10:
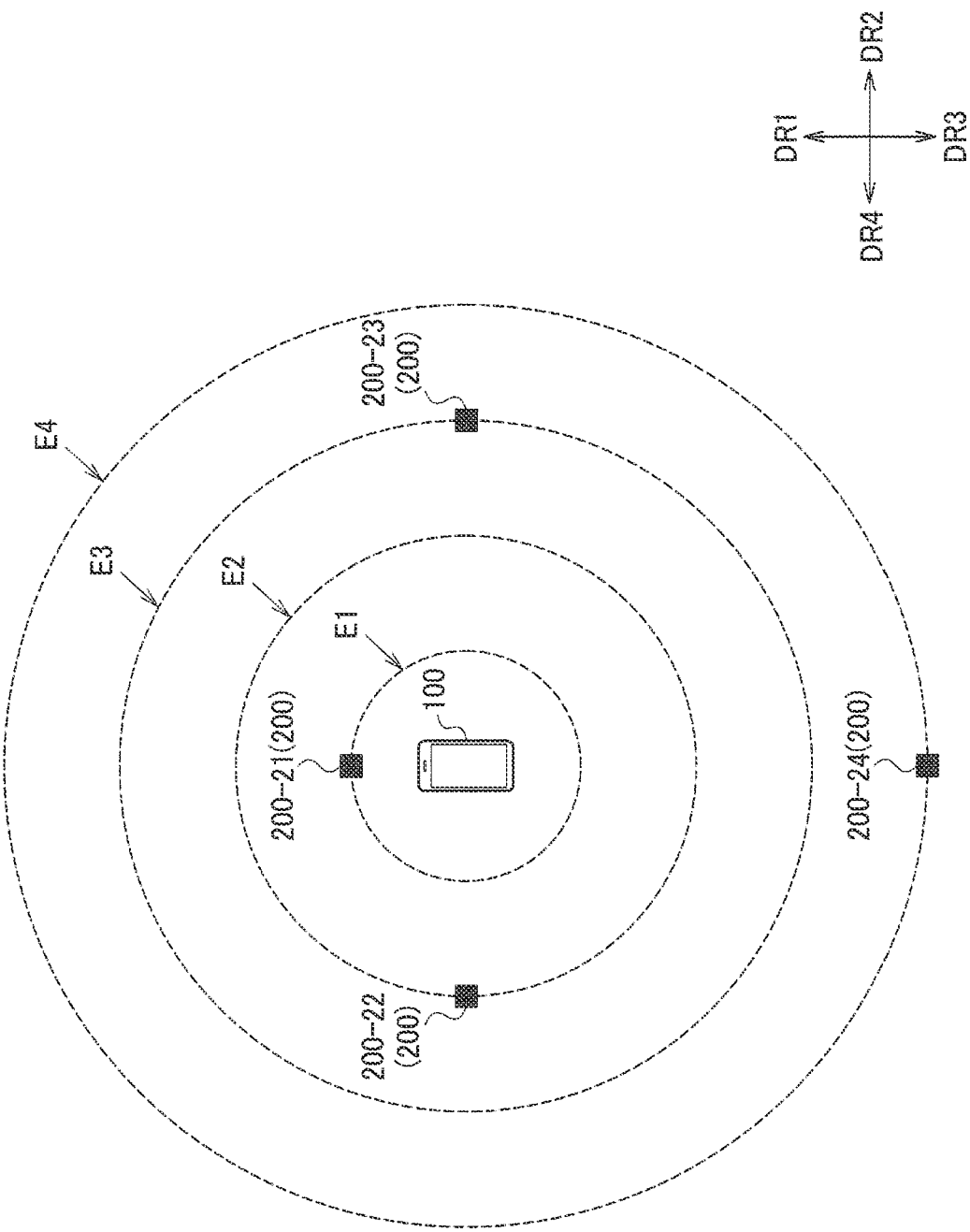
FIG. 10 explains the relationship between direction and distance of an electronic device in another modification example.
Figure 11:
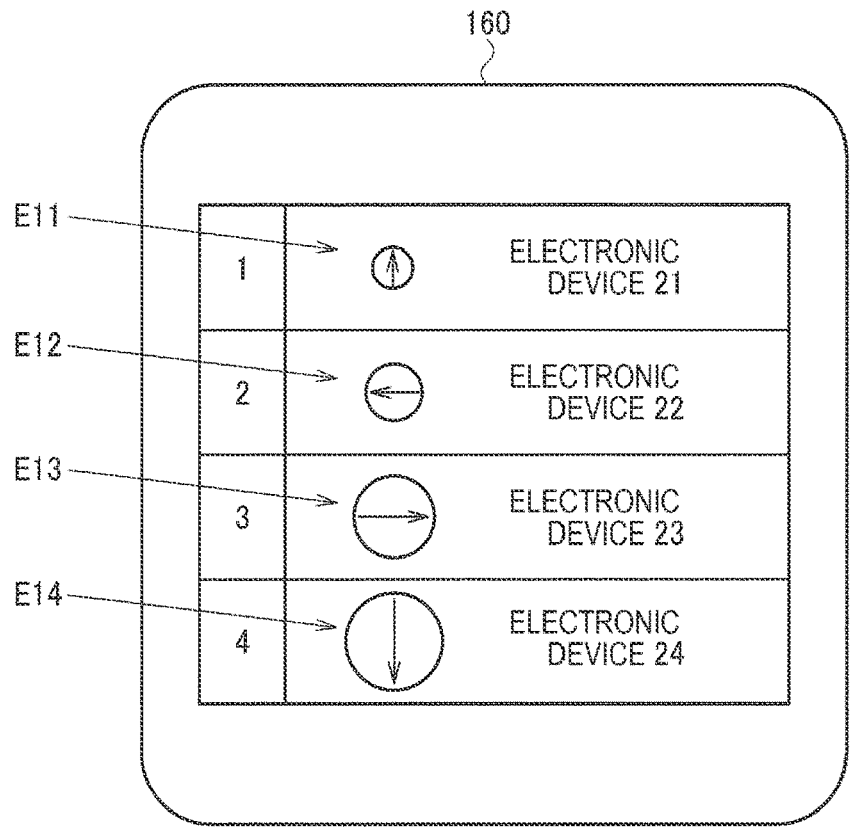
FIG. 11 explains a display example in another modification example.
Figure 12:
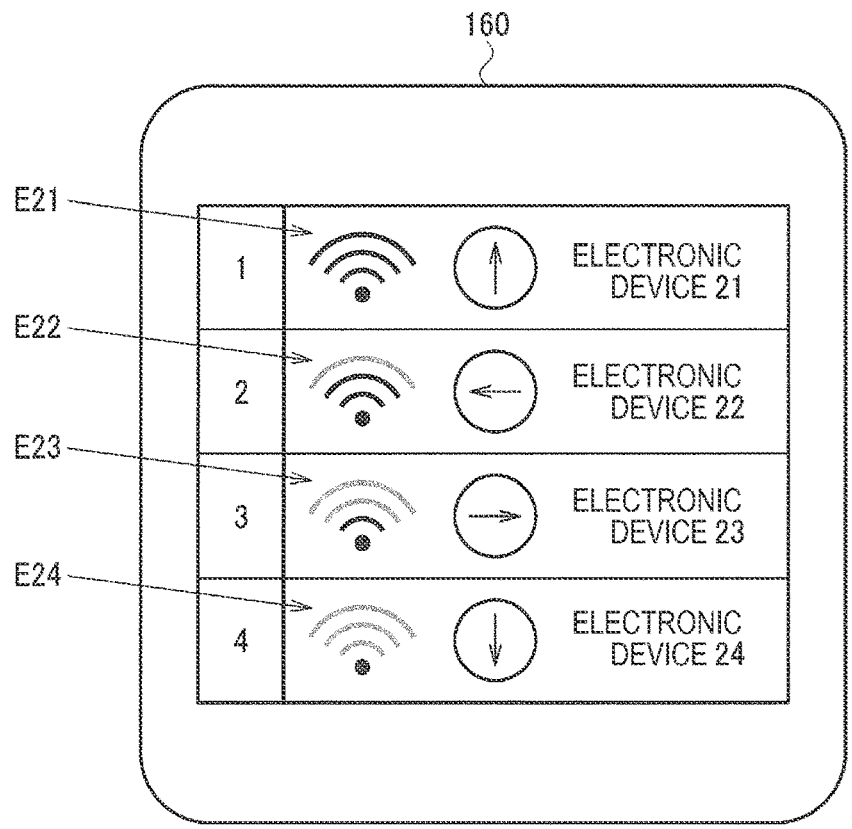
FIG. 12 explains a display example in another modification example.

When the electronic devices 200 are located at the locations shown in FIG. 10, the direction image icon for the electronic device 200 nearer to the information processing device 100 is displayed in a form having a smaller size and having an arrow with a shorter length, as indicated by E11, E12, E13, E14 in FIG. 11. In this way, in the information processing device 100 in this embodiment, the control unit 150 changes the display form of the direction image according to the distance from the electronic device 200. Thus, the user can grasp the information of the distance between the information processing device 100 and the electronic device 200 and the direction information, from one direction image. Since there is no need for an area showing the information of the distance between the information processing device 100 and the electronic device 200, the degree of freedom in displaying the information about the electronic device 200 can be increased. In FIG. 11, the icons indicated by E11 to E14 are made different from each other in the entire size. However, for example, the icons indicated by E11 to E14 may be in the same size and only the length of the arrow may be changed according to the distance between the information processing device 100 and the electronic device 200.

The example shown in FIG. 11 is a display based on the intensity of a BLE beacon signal received by the information processing device 100 via the BLE communication unit 112 of the wireless communication unit 110. However, the information processing device 100 in this embodiment can also receive a Wi-Fi wireless communication radio wave via the Wi-Fi communication unit 114 of the wireless communication unit 110, as described above. Thus, a display form showing the Wi-Fi radio wave intensity may also be displayed, as indicated by E21, E22, E23, E24 in FIG. 12. For example, as the processing of establishing a correspondence to the identification information of the electronic device 200 from each of BLE and Wi-Fi radio waves is executed, as described above with reference to the search processing (step S100) shown in FIG. 2, a display example in FIG. 12 can be implemented through the entire processing shown in FIG. 2. Thus, for example, when the user wants to make a handover from BLE to Wi-Fi, the user can properly select the electronic device 200, considering both the direction information of the electronic device 200 and the information of the Wi-Fi radio wave intensity. Therefore, for example, when the electronic device 200 is a printer, the user can execute a print job with a large volume by making a handover from BLE to Wi-Fi.

The technique in this embodiment is not limited to the above and can be implemented with various modifications. For example, the control unit 150 may additionally display a connection history for a plurality of electronic devices 200 given in the list. Specifically, for example, it is assumed that, in the example shown in FIG. 4, the electronic device 200-1 and the electronic device 200-4 have been connected to the information processing device 100 before in the Wi-Fi infrastructure mode. In this case, the control unit 150 displays an indication indicating that the electronic device 200-1 has a connection history in the display area for the electronic device 200-1 in the list on the display unit 160, as indicated by F11 in FIG. 13. In the indication of F11, characters are used to show that the electronic device 200-1 has been connected before. However, this is not limiting. A predetermined symbol or the like may be used and any display form that the user can instantly understand may be employed. Similarly, the control unit 150 displays the indication indicating that the electronic device 200-4 has a connection history in the display area for the electronic device 200-4 in the list on the display unit 160, as indicated by F12. If the user has never used the electronic device 200-3, nothing is displayed in the display area for the electronic device 200-3 in the list, as indicated by F14.

As described above, in the information processing device 100 in this embodiment, the control unit 150 displays a connection history for the electronic device 200 that has been connected in the past, in the list. Thus, the user can easily grasp the electronic device 200 that has been connected in the past, when a plurality of electronic devices 200 are displayed in the list. Therefore, for example, as the user selects the electronic device 200 that has been connected in the past, the setting is easily configured again and the user can swiftly use the electronic device 200.

Also, for example, it is assumed that, in the example shown in FIG. 4, the electronic device 200-2 transmits a radio wave based on the direction connection mode and that the Wi-Fi communication unit 114 of the wireless communication unit 110 receives this radio wave. In this case, the control unit 150 displays an indication indicating that a setting operation is needed in the display area for the electronic device 200-2 in the list on the display unit 160, as indicated by F13 in FIG. 13.

Figure 13:
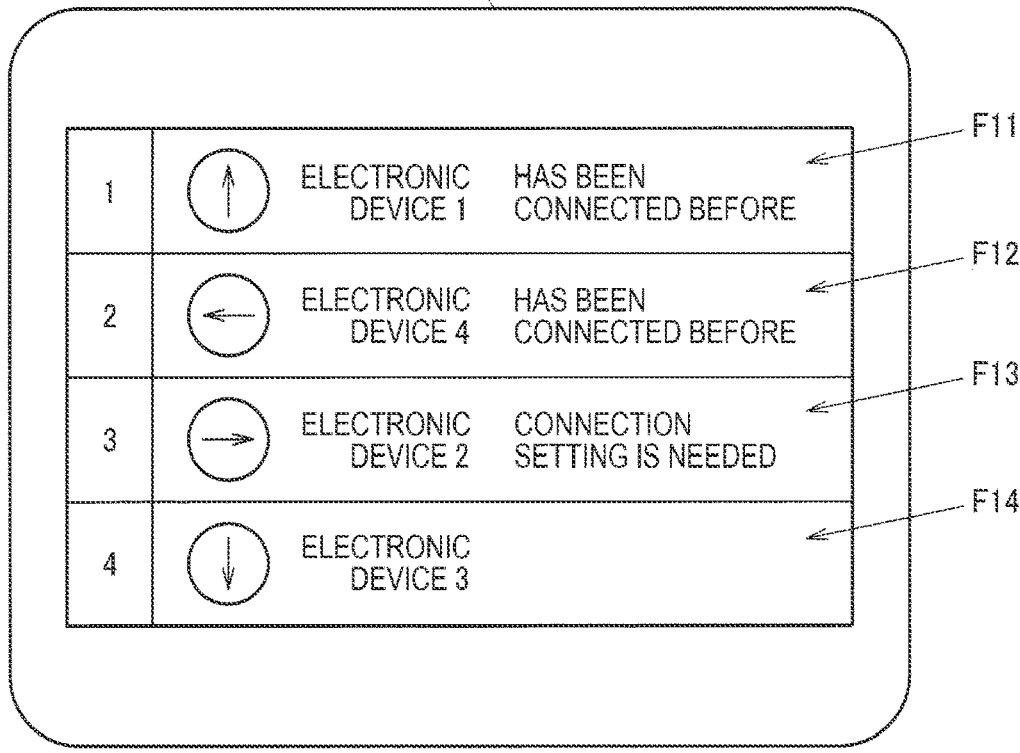
FIG. 13 explains a display example in another modification example.

As described above, in the information processing device 100 in this embodiment, the control unit 150 displays, in the list, an indication that a setting operation is needed for the electronic device 200 that needs a connection setting. Thus, the user can easily grasp the electronic device 200 that needs a connection setting, when a plurality of electronic devices 200 are displayed in the list. Therefore, when a plurality of electronic devices 200 are displayed in the list, the user can easily determine the electronic device 200 to be selected. For example, when the indication is displayed as shown in FIG. 13, the user can easily grasp that it is more convenient to select the electronic device 200-1 or the electronic device 200-4 than to select the electronic device 200-3. For the electronic device 200-1 and the electronic device 200-4, the indication that a setting operation is needed is not superimposed. This is because the search is performed on the assumption that the electronic device 200-1 and the electronic device 200-4 have been able to be connected in the Wi-Fi infrastructure mode. Once the user had configured a connection setting for the electronic device 200-3, the control unit 150 may erase the indication that a setting operation is needed, indicated by F13, when the display is updated as the processing shown in FIG. 2 is executed again.

Figure 14:
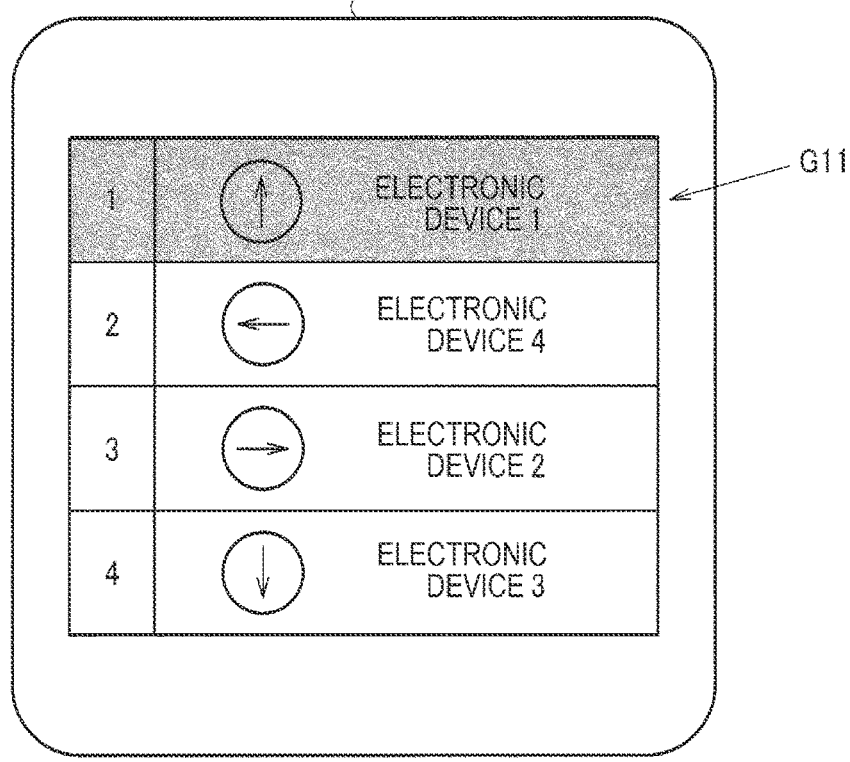
FIG. 14 explains a display example in another modification example.

The technique in this embodiment is not limited to the above and can be implemented with various modifications. For example, the control unit 150 may highlight a part of the plurality of electronic devices 200 shown in the list. For example, in the example shown in FIG. 14, it is assumed that the electronic device 200-1 is located nearer to the information processing device 100 than the other electronic devices 200, that is, the electronic device 200-2, the electronic device 200-3, and the electronic device 200-4, as indicated by G11. In this case, the control unit 150 may differentiate the background color of the display areas for the electronic device 200-2, the electronic device 200-3, and the electronic device 200-4 from the background color of the display area for the electronic device 200-1 on the display unit 160, for example, as shown in FIG. 14. Thus, the user can recognize that the electronic device 200-1 is at the nearest location from the user.

As described above, in the information processing device 100 in this embodiment, the control unit 150 performs a display that highlights the electronic device 200 located at the shortest distance, of a plurality of electronic devices 200. Thus, when a plurality of electronic devices 200 are displayed in the list, the user can easily grasp the electronic device 200 located at the shortest distance. Therefore, when a plurality of electronic devices 200 are displayed in the list, the user can easily determine the electronic device 200 to be selected. FIG. 14 shows an example where the background color is differentiated. However, this is not limiting. For example, the control unit 150 may change the form or the like of the characters displayed in the display area for the electronic device 200-1 and thus may be able to distinguish the electronic device 200-1 from the other electronic devices 200, that is, the electronic device 200-2, the electronic device 200-3, and the electronic device 200-4. Changing the form or the like of the characters is, for example, changing the color of the characters, changing the font style of the characters to italic, bold or the like, and so on. The control unit 150 may also be able to combine a plurality of the above changes. The user may also be able to change the setting for highlighting the electronic device 200 located at the shortest distance.

Figure 15:
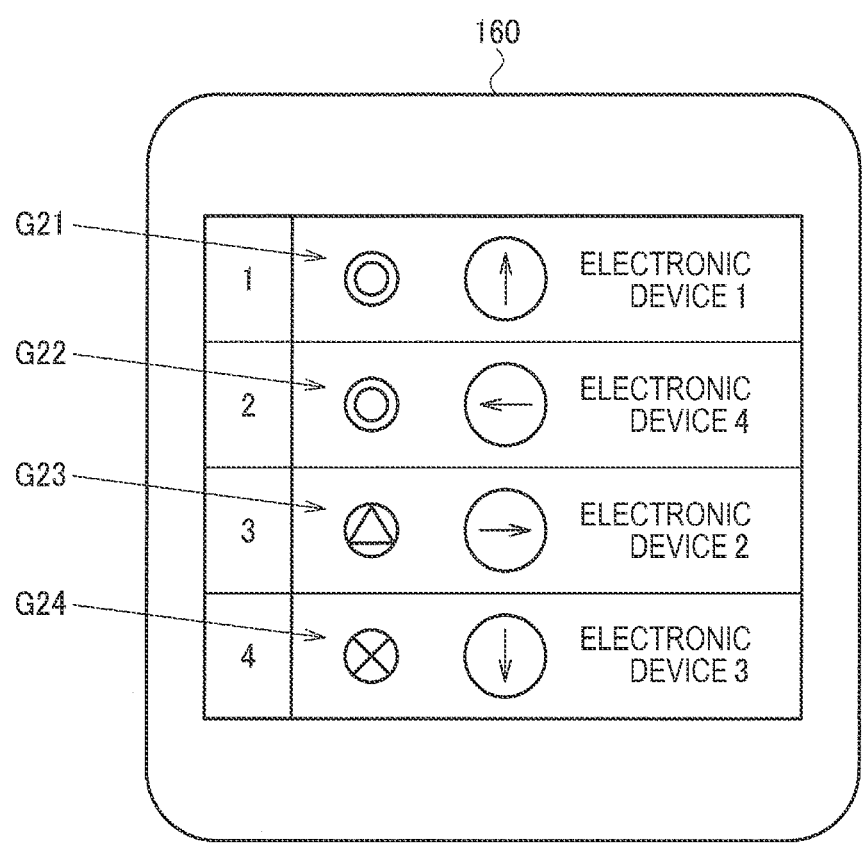
FIG. 15 explains a display example in another modification example.

Also, for example, the control unit 150 may perform a display showing the state of each of a plurality of electronic devices 200 shown in the list. The state can also be referred to as the status. Such a display can be implemented by including information representing the state of the electronic device 200 into the payload of the BLE advertisement packet, as described above. For example, G21 in FIG. 15 is a form showing that the electronic device 200-1 is on standby for execution. G22, similar to G21, is a form showing that the electronic device 200-2 is on standby for execution. Also, for example, G23 is a form showing that the electronic device 200-3 is executing a predetermined operation. For example, when the electronic device 200-3 is a printer, the predetermined operation is printing or the like. Also, for example, G24 is a form showing that an error has occurred in the electronic device 200-4. As described above, in the information processing device 100 in this embodiment, the control unit 150 performs a display showing the state of the electronic device 200, for each of a plurality of electronic devices 200. Thus, when a plurality of electronic devices 200 are displayed in the list, the user can easily grasp the state of each electronic device 200. Therefore, when a plurality of electronic devices 200 are displayed in the list, the user can easily determine whether to select each electronic device 200 or not. For example, the user grasps that the electronic device 200-3 is executing a predetermined operation as indicated by G23, and thus can determine that the electronic device 200-3 will not quickly become available for use. Similarly, for example, the user grasps that an error has occurred in the electronic device 200-4 as indicated by G24, and thus can determine that the electronic device 200-4 is not available for use. The form for distinguishing the state of the electronic device 200 is not limited to the examples indicated by G21, G22, G23, G24. For example, the state of the electronic device 200 may be able to be distinguished, based on the color of the icon or the like. The control unit 150 may also execute processing of hiding the icons indicated by G21 to G24 or the like, for the electronic device 200 that has never been connected in the past.

In this embodiment, the technique shown in FIG. 14 and the technique shown in FIG. 15 may be combined together, though not illustrated. Thus, for example, the user can more securely determine that there is no problem in selecting the electronic device 200-1 because the electronic device 200-1 exists at the shortest distance from the information processing device 100 and is on standby for execution.

As described above, the information processing device according to this embodiment wirelessly communicates with an electronic device via a wireless communication unit and includes a search result acquisition unit, a direction information acquisition unit, and a control unit. The search result acquisition unit acquires information of a search result about the electronic device by a search via the wireless communication unit. The direction information acquisition unit acquires direction information representing a direction in which the electronic device exists, by short-range wireless communication with the electronic device via the wireless communication unit. The control unit displays, on a display unit, a list of a plurality of the electronic devices found by the search, based on the information of the search result, and executes processing of deciding a display priority order of the electronic device, based on the direction information, and displaying information of the electronic device on the display unit, based on information of the display priority order.

Thus, the information of the plurality of electronic devices based on the display priority order is displayed as a list on the display unit. Therefore, a user can grasp the display priority order of the electronic device based on the search result and the direction information.

The control unit may display the electronic device in the list in order from the electronic device whose direction detected based on the information of the display priority order is close to a predetermined direction.

Thus, the user can grasp the electronic device located in the predetermined direction or in the direction close to the predetermined direction.

The control unit may set the predetermined direction, based on input information from the user.

Thus, the user can grasp the electronic device located in the predetermined direction or in the direction close to the predetermined direction, based on the user's own setting.

The control unit may execute processing of establishing a correspondence between first identification information included in the information of the search result acquired from the electronic device by the search via the wireless communication unit and second identification information of the electronic device whose direction information is acquired by short-range wireless communication, and thus may perform a display in which information of a direction to which the second identification information corresponds and the electronic device correspond to each other.

Thus, when a search is performed based on a plurality of types of wireless communication including the short-range wireless communication, the list of the search results can be properly displayed.

The control unit may display a direction image showing the direction of the electronic device at a position corresponding to an area showing the electronic device in the displayed list.

Thus, the user can visually grasp the direction information corresponding to each electronic device.

The control unit may change the display form of the direction image according to the distance from the electronic device.

Thus, the user can grasp the information of the distance between the information processing device and the electronic device and the direction information, from one direction image.

The control unit may acquire information of a radio wave intensity of a radio wave transmitted from the electronic device, by the short-range wireless communication with the electronic device, and may decide an order of displaying in the list according to a distance decided based on the information of the radio wave intensity.

Thus, the user can grasp the display order based on the distance to each electronic device.

The control unit may perform a display that highlights the electronic device located at the shortest distance, of the plurality of electronic devices.

Thus, when a plurality of electronic devices are displayed in the list, the user can easily grasp the electronic device located at the shortest distance.

The control unit may display the electronic device that is found, in the list, as classified into a plurality of distance range groups.

Thus, the user can visually grasp the distance range group corresponding to each electronic device.

The control unit may display the electronic device found based on the direction information, in the list, in each of the plurality of distance range groups.

Thus, the user can grasp the display order of the electronic device, based on both information of the distance range group and the direction information.

The control unit may execute, based on input information from the user, processing of switching between the list displaying the electronic device found based on the direction information and the list displaying the electronic device found based on distance information.

Thus, the user can properly display the list, based on information to be emphasized.

The control unit may hide an image based on the direction information for the electronic device located in a far distance range, of the plurality of distance range groups.

Thus, the user can select the electronic device, based on a proper amount of information.

The control unit may display a connection history in the list, for the electronic device that has been connected in the past.

Thus, the user can easily grasp the electronic device that has been connected in the past, when a plurality of electronic devices are displayed in the list.

The control unit may display an indication that a setting operation is needed, in the list, for the electronic device that needs a connection setting.

Thus, the user can easily grasp the electronic device that needs a connection setting, when a plurality of electronic devices are displayed in the list.

The information of the search result may be information acquired via one of a wireless LAN infrastructure mode, a direct connection mode, and short-range wireless communication by the wireless communication unit. The short-range wireless communication may be Bluetooth communication.

Thus, a system for displaying the information of the search result about the electronic device at the information processing device can be constructed, using Wi-Fi, which is a wireless LAN, and Bluetooth.

The program according to this embodiment causes a computer to function as a wireless communication unit wirelessly communicating with an electronic device, a search result acquisition unit, a direction information acquisition unit, and a control unit. The search result acquisition unit acquires information of a search result about the electronic device by a search via the wireless communication unit. The direction information acquisition unit acquires direction information representing a direction in which the electronic device exists, by short-range wireless communication with the electronic device via the wireless communication unit. The control unit displays, on a display unit, a list of a plurality of the electronic devices found by the search, based on the information of the search result, and executes processing of deciding a display priority order of the electronic device, based on the direction information, and displaying information of the electronic device on the display unit, based on information of the display priority order.

The embodiment has been described above in detail. However, a person skilled in the art can readily understand that various modifications can be made without substantially departing from the new matters and effects of the embodiment. Therefore, all such modification examples are included in the scope of the present disclosure. For example, a term described along with a different term having a broader meaning or the same meaning at least once in the specification or the drawings can be replaced with the different term at any point in the specification or the drawings. Also, all combinations of the embodiment and modification examples are included in the scope of the present disclosure. The configurations and operations of the information processing device and the program or the like are not limited to those described in the embodiment and can be implemented with various modifications.

What is claimed is:

1. An information processing device wirelessly communicating with an electronic device via a wireless communication unit, the information processing device comprising:
   a search result acquisition unit acquiring information of a search result about the electronic device by a search via the wireless communication unit;
   a direction information acquisition unit acquiring direction information representing a direction in which the electronic device exists with respect to the information processing device, by short-range wireless communication with the electronic device via the wireless communication unit; and
   a controller displaying, on a display, a list of a plurality of the electronic devices found by the search, based on the information of the search result, wherein
   the controller executing processing of deciding a display priority order of the electronic device, based on the direction information, and displaying information of the electronic device with the direction information on the display, based on the display priority order.

2. The information processing device according to claim 1, wherein
   the controller displays the electronic device in the list in order from the electronic device whose direction detected based on the information of the display priority order is close to a predetermined direction.

3. The information processing device according to claim 2, wherein
   the controller sets the predetermined direction, based on input information from a user.

4. The information processing device according to claim 1, wherein
   the controller executes processing of establishing a correspondence between first identification information included in the information of the search result acquired from the electronic device by the search via the wireless communication unit and second identification information of the electronic device whose direction information is acquired by the short-range wireless communication, and thus performs a display in which information of a direction to which the second identification information corresponds and the electronic device correspond to each other.

5. The information processing device according to claim 1, wherein
the controller displays a direction image showing a direction of the electronic device at a position corresponding to an area showing the electronic device in the displayed list.

6. The information processing device according to claim 5, wherein
the controller changes a display form of the direction image according to a distance from the electronic device.

7. The information processing device according to claim 1, wherein
the controller
acquires information of a radio wave intensity of a radio wave transmitted from the electronic device, by the short-range wireless communication with the electronic device, and
decides an order of displaying in the list according to a distance decided based on the information of the radio wave intensity.

8. The information processing device according to claim 1, wherein
the controller performs a display that highlights the electronic device located at a shortest distance, of a plurality of the electronic devices.

9. The information processing device according to claim 1, wherein
the controller displays the electronic device that is found, in the list, as classified into a plurality of distance range groups.

10. The information processing device according to claim 9, wherein
the controller displays the electronic device found based on the direction information, in the list, in each of the plurality of distance range groups.

11. The information processing device according to claim 10, wherein
the controller executes, based on input information from a user, processing of switching between the list displaying the electronic device found based on the direction information and the list displaying the electronic device found based on distance information.

12. The information processing device according to claim 9, wherein
the controller hides an image based on the direction information for the electronic device located in a far distance range, of the plurality of distance range groups.

13. The information processing device according to claim 1, wherein
the controller displays a connection history in the list, for the electronic device that has been connected in the past.

14. The information processing device according to claim 1, wherein
the controller displays an indication that a setting operation is needed, in the list, for the electronic device that needs a connection setting.

15. The information processing device according to claim 1, wherein
the information of the search result is information acquired via one of a wireless LAN infrastructure mode, a direct connection mode, and the short-range wireless communication by the wireless communication unit, and
the short-range wireless communication is Bluetooth communication.

16. A non-transitory computer-readable storage medium storing a program, the program causing a computer to function as:
a wireless communication unit wirelessly communicating with an electronic device;
a search result acquisition unit acquiring information of a search result about the electronic device by a search via the wireless communication unit;
a direction information acquisition unit acquiring direction information representing a direction in which the electronic device exists with respect to the computer, by short-range wireless communication with the electronic device via the wireless communication unit; and
a controller displaying, on a display, a list of a plurality of the electronic devices found by the search, based on the information of the search result, wherein
the controller executing processing of deciding a display priority order of the electronic device, based on the direction information, and displaying information of the electronic device with the direction information on the display, based on the display priority order.

* * * * *